(12) United States Patent
Whitmore

(10) Patent No.: US 10,272,800 B2
(45) Date of Patent: Apr. 30, 2019

(54) SEAT

(71) Applicant: Bentley Motors Limited, Crewe Cheshire (GB)

(72) Inventor: Paul Whitmore, Crewe (GB)

( * ) Notice: Subject to any disclaimer, the term of this patent is extended or adjusted under 35 U.S.C. 154(b) by 0 days.

(21) Appl. No.: 15/534,466

(22) PCT Filed: Dec. 16, 2015

(86) PCT No.: PCT/GB2015/054023
§ 371 (c)(1),
(2) Date: Jun. 8, 2017

(87) PCT Pub. No.: WO2016/097719
PCT Pub. Date: Jun. 23, 2016

(65) Prior Publication Data
US 2017/0368960 A1    Dec. 28, 2017

(30) Foreign Application Priority Data

Dec. 17, 2014   (GB) .................................. 1422499.2
Aug. 24, 2015   (GB) .................................. 1515020.4

(51) Int. Cl.
| A47C 7/18 | (2006.01) |
|---|---|
| A47C 7/02 | (2006.01) |
| A47C 7/14 | (2006.01) |
| A47C 7/24 | (2006.01) |
| B60N 2/02 | (2006.01) |
| B60N 2/90 | (2018.01) |

(Continued)

(52) U.S. Cl.
CPC ................. *B60N 2/02* (2013.01); *B60N 2/56* (2013.01); *B60N 2/5642* (2013.01); *B60N 2/58* (2013.01); *B60N 2/643* (2013.01); *B60N 2/646* (2013.01); *B60N 2/686* (2013.01); *B60N 2/70* (2013.01); *B60N 2/7017* (2013.01); *B60N 2/7035* (2013.01); *B60N 2/976* (2018.02); *B60N 2/986* (2018.02); *B60N 2002/5808* (2013.01)

(58) Field of Classification Search
CPC .......... B60N 2/02; B60N 2/643; B60N 2/449; B60N 2/5642; B60N 2/686; B60N 2/448; B60N 2/58; B60N 2/7035; B60N 2002/5808
USPC ............ 297/452.27, 452.34, 452.35, 452.37
See application file for complete search history.

(56) References Cited

U.S. PATENT DOCUMENTS

| 3,612,607 A | * | 10/1971 | Lohr | ........................ A47C 7/18 |
| | | | | 297/452.27 X |
| 3,844,614 A | * | 10/1974 | Babbs | .................. B60N 2/5825 |
| | | | | 297/452.37 X |

(Continued)

FOREIGN PATENT DOCUMENTS

| DE | 10108318 A1 | 9/2002 |
| DE | 102005012987 A1 | 11/2005 |

(Continued)

*Primary Examiner* — Rodney B White
(74) *Attorney, Agent, or Firm* — Adler Pollock & Sheehan, P.C.; Daniel J. Holmander, Esq.

(57) ABSTRACT

The main cushion (3) of an automobile seat (e.g. the seat pan cushion, or a backrest cushion) is provided with a shield (2). The shield surrounds at least part of the lateral sides of the main cushion and is formed of a less compressible (i.e. harder) foam than the main cushion, such that when the seat is upholstered, creases in the upholstery are reduced/prevented and gapping is avoided.

14 Claims, 5 Drawing Sheets

(51) Int. Cl.
*B60N 2/56* (2006.01)
*B60N 2/58* (2006.01)
*B60N 2/64* (2006.01)
*B60N 2/68* (2006.01)
*B60N 2/70* (2006.01)

(56) References Cited

U.S. PATENT DOCUMENTS

| | | | | |
|---|---|---|---|---|
| 3,924,893 A * | 12/1975 | Ferrara | ................ | B60N 2/5621 |
| | | | | 297/452.34 |
| 4,379,856 A | 4/1983 | Samaritter | | |
| 4,615,561 A * | 10/1986 | Nomura | ................... | A47C 7/74 |
| | | | | 297/452.34 X |
| 4,747,638 A * | 5/1988 | Saito | ........................ | B60N 2/58 |
| | | | | 297/452.35 |
| 4,837,881 A * | 6/1989 | Kondo | ..................... | A47C 7/18 |
| | | | | 297/452.27 |
| 4,865,379 A * | 9/1989 | Aoki | ..................... | B60N 2/5685 |
| | | | | 297/452.27 X |
| 5,314,235 A * | 5/1994 | Johnson | ................ | A47C 7/425 |
| | | | | 297/452.34 X |
| 5,437,498 A * | 8/1995 | Waelde | ................... | B60N 2/449 |
| | | | | 297/452.34 |
| 5,544,942 A * | 8/1996 | Vu Khac | ................ | A47C 7/18 |
| | | | | 297/452.27 |
| 5,704,691 A * | 1/1998 | Olson | ....................... | A47C 7/18 |
| | | | | 297/452.37 X |
| 5,707,109 A * | 1/1998 | Massara | ................ | B60N 2/914 |
| | | | | 297/452.34 X |
| 5,850,645 A * | 12/1998 | Ogawa | ..................... | A47C 7/18 |
| | | | | 297/452.27 X |
| 5,895,096 A * | 4/1999 | Massara | ................... | B60N 2/70 |
| | | | | 297/452.34 X |
| 6,027,171 A * | 2/2000 | Partington | ........... | B60N 2/0232 |
| | | | | 297/452.35 X |
| 6,033,024 A * | 3/2000 | Pfau | ........................ | A47C 7/20 |
| | | | | 297/452.35 X |
| 6,247,751 B1 * | 6/2001 | Faust | ................... | B60N 2/5635 |
| | | | | 297/452.27 X |
| 6,485,101 B2 * | 11/2002 | Kassai | ................. | B60N 2/2821 |
| | | | | 297/452.34 X |
| 6,652,034 B1 * | 11/2003 | Schramm | ................ | A47C 7/185 |
| | | | | 297/452.35 X |
| 7,040,707 B2 * | 5/2006 | Nakahara | ............. | B60N 2/5621 |
| | | | | 297/452.27 X |
| 7,252,341 B2 * | 8/2007 | Kircher | .................... | B60N 2/68 |
| | | | | 297/452.34 X |
| 7,585,030 B2 * | 9/2009 | Galbreath | ................ | B60N 2/70 |
| | | | | 297/452.27 |
| 7,641,281 B2 * | 1/2010 | Grimm | .................. | B60N 2/449 |
| | | | | 297/452.34 X |
| 7,661,764 B2 * | 2/2010 | Ali | .......................... | B68G 7/05 |
| | | | | 297/452.35 X |
| 8,215,714 B2 * | 7/2012 | Galbreath | ................ | B60N 2/70 |
| | | | | 297/452.27 |
| 8,714,654 B2 * | 5/2014 | Nitsuma | .............. | B60N 2/4228 |
| | | | | 297/452.35 |
| 9,004,605 B2 * | 4/2015 | Nishiyama | ............... | B60N 2/90 |
| | | | | 297/452.27 |
| 2004/0145230 A1 * | 7/2004 | Fujita | ................... | A47C 31/006 |
| | | | | 297/452.27 |
| 2005/0236884 A1 * | 10/2005 | Neale | ................... | B60N 2/5816 |
| | | | | 297/452.34 X |
| 2006/0152062 A1 * | 7/2006 | Archambault | ........... | B60N 2/80 |
| | | | | 297/452.34 |
| 2006/0273650 A1 * | 12/2006 | Embach | ................ | A47C 7/18 |
| | | | | 297/452.27 |
| 2010/0133891 A1 | 6/2010 | Onoda | | |
| 2012/0068519 A1 | 3/2012 | Lhommeau | | |
| 2013/0049424 A1 | 2/2013 | Funaki | | |

FOREIGN PATENT DOCUMENTS

| | | |
|---|---|---|
| DE | 102008037231 A1 | 2/2010 |
| EP | 0056939 A2 | 4/1982 |
| FR | 29242423 A1 | 8/2010 |
| JP | 2000262347 A | 9/2000 |
| JP | 2001070082 A | 3/2001 |
| JP | 2003199644 A | 7/2003 |

\* cited by examiner

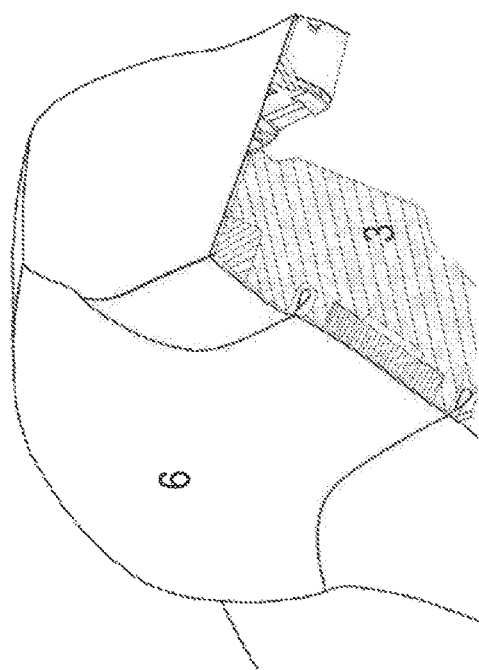

SEAT

CROSS REFERENCE TO RELATED APPLICATIONS

This application is a national phase filing under 35 U.S.C. § 371 of International Application No. PCT/GB2015/054023 filed Dec. 16, 2015, which claims priority from Great Britain application numbers 1422499.2, filed Dec. 17, 2014 and 1515020.4 filed. Aug. 24, 2015, the entire contents of each are hereby incorporated by reference herein.

TECHNICAL FIELD OF THE INVENTION

The present invention relates to a seat, in particular a vehicle seat and especially an automobile seat.

BACKGROUND TO THE INVENTION

Automobile seats are made using foam padding of different density and compressibility depending on factors such as cost and level of sportiness/luxury. The foam used for seats in sports cars will typically be relatively hard and relatively thin, in order to provide a high level of support, in particular lateral support. In seats for sporty automobiles, the foam is attached to a hard shell which will typically include deep supports either side of the seat cushion to restrain lateral movement of the legs/hips and additional deep supports either side of the backrest to restrain lateral movement of the body. On the other hand, at the luxury end of the market, the supports either side of the seat cushion are relatively shallow and formed by the shape of the cushion itself, to make it easier to get into and out of the seat, similarly the bolsters either side of the backrest are shallow, to aid entry/exit. The foam padding of seat cushions and backrests in luxury automobiles tend to be soft and thick to provide a high degree of cushioning and comfort. In between these two market segments, a compromise between hard, thin foams and soft thick foams is made to provide sufficient comfort at an acceptable cost.

Seats have been proposed in which a plurality of foams of different hardness are provided. For example, JP2010-142571 and US2010/0133891 both disclose seats in which the seat cushion has a hard lower layer (which is generally cheaper to produce) and a soft upper layer for comfort. FR2942423 on the other hand discloses seat padding, in which rather than providing bolsters as a hard shell covered with foam, bolsters are formed from a hard foam formed in a mould alongside a central region of softer foam.

The present invention is concerned especially with the provision of seats for luxury automobiles, in which a high level of softness is required for comfort alongside an aesthetically pleasing appearance. A high level of softness can be obtained by use of thick, soft foam as discussed above, however, when upholstery is applied to thick layers of soft foam, tension in the trimming materials e.g. leather upholstery, around the outer edge of the foam can crush and crease the foam giving visually unacceptable results, including "gapping", where a gap can be seen beneath the upholstery, where the foam is not applying outward pressure on the upholstery. This leads to a perceivable air gap between the upholstery and the foam beneath. These creases/gaps in backrests can reduce the lateral support and comfort of a seat.

Embodiments of the present invention seek to overcome this problem without sacrificing the comfort associated with soft foam padding.

SUMMARY OF THE INVENTION

According to the invention there is provided a seat comprising a main cushion formed of padding and a shield formed of padding, wherein the padding of the shield has a first compressibility and the padding of the main cushion has a second compressibility, wherein the first compressibility is lower than the second compressibility.

As will be well understood by those skilled in the art, material with a high compressibility is soft and its measure of compressibility has a low value in kPa, whereas material with a low compressibility is hard and has a high value in kPa.

The provision of a shield which is less compressible than the main cushion can reduce/prevent gapping, creasing and any consequential lack of lateral support.

The shield may be provided as a thin layer.

The shield may be less than 5 cm thick, for example less than 3 cm thick, such as between 1.5 cm thick and 2.5 cm thick, e.g. 2 cm thick (i.e. about 2 cm thick). Thickness may be the average thickness of the shield.

The shield may have a first thickness, being its thickness at its thickest part and the main cushion may have a second thickness, being its thickness at its thickest part and the second thickness may be greater than the first thickness.

The main cushion may be the cushion of a seat pan, i.e. a seat-cushion, on which an occupant sits, or the main cushion may be the cushion of a backrest, i.e. a backrest-cushion against which an occupant's back rests. Or, both the seat-cushion and the backrest-cushion may be main cushions according to the invention with shields surrounding at least part of their periphery.

In either case, the shield may shield the lateral sides of the main cushion and optionally a portion of the front and/or rear sides of the main cushion. The shield may surround at least part of the lateral sides, e.g. at least part of the peripheral corners thereof, or may surround substantially all of the lateral sides, e.g. the whole of the lateral sides except for regions where apertures are provided, e.g. for components/controls to be provided in the sides of the seat.

The main cushion may comprise a central section and lateral bolster portions. As set out above, the main cushion may be a backrest cushion. In that case, the central section may be a back-supporting section. The lateral bolster portions may be separate from or integral with the central section.

The bolster portions may comprise laterally outer sides and the shield may shield the laterally outer sides of the lateral bolster portions. The shield may surround at least part of the laterally outer sides of the lateral bolster portions, e.g. substantially all of the lateral sides, such as the whole of the laterally outer sides except for regions apertures are provided for controls etc.

The bolster portions may comprise front surfaces which, in use, face forwards (i.e. towards the direction in front of an occupant sitting in the seat), and front corners between the laterally outer sides and the front surfaces of the lateral bolster portions and the shield may extend around the front corners of the bolster portions and may cover at least a portion of the front surfaces of the bolster portions. It may be that the problems of gapping/creasing only affect one side of the seat, in which case the shield may shield only one lateral side, and optionally only one front corner The shield may further extend around at least part of a back corner, covering at least part of the lateral edges of the back of the main cushion/backrest.

The backrest may comprise a support frame to which the main cushion is attached and the shield may extend around at least part of the lateral edges of the support frame.

The support frame may comprise lateral bolster supports and the shield may surround the lateral bolster supports.

The compressibility of the central section and the lateral bolster portions may be different, such that the seat comprises a shield formed of padding having a first compressibility, and a main cushion formed of a central section comprising padding having a second compressibility and bolster portions comprising padding having a third compressibility, wherein the first compressibility is less than the second compressibility and the third compressibility.

The second compressibility, i.e. that of the central section (e.g the back-supporting section), may be higher than that of the third compressibility. Accordingly, the cushion will have a relatively soft central section, relatively harder lateral bolster portions and a shield which is harder still.

The first compressibility may be at least 5 kPa, for example at least 10 kPa, such as about 13 to 28 kPa, e.g. 15 kPa (i.e. about 15 kPa).

The second compressibility may be less than 10 kPa, for example less than 6 kPa, such as 3 to 5 kPa, e.g. 4 kPa (i.e. about 4 kPa).

The third compressibility may be between 5 and 10 kPa, for example between 5 and 8 kPa, such as 5 to 7 kPa, e.g. 6 kPa (i.e. about 6 kPa).

The seat may comprise a headrest situated above the main cushion and the shield may extend beneath the headrest.

The seat may further comprise a layer of 3D ventilation spacer layer in front of the central back-supporting section of the main cushion.

The seat may further comprise a layer of heater foam in front of the main cushion. The heater foam may be positioned in front of the central back supporting section and optionally in front of the bolster portions and may be positioned in front of the layer of the 3D ventilation spacer layer.

The seat may comprise upholstery stretched around the shield.

The upholstery may be selected from leather, suede, alcantara, imitations thereof, plastics material or any other suitable material. In particular, the upholstery may be selected from leather, suede, alcantara, for example leather on which creases and gapping are especially visible.

The padding, i.e. the padding of the main cushion and/or the padding of the shield may be foam. The padding of either or both of the central, back-supporting section and the lateral bolster portions may be foam. Alternatively, for example, the padding could be of spacer material.

The padding i.e. the padding of the main cushion and/or the padding of the shield may have a density of between 30 $kg/m^3$ and 100 $kg/m^3$, for example between 50 $kg/m^3$ and 80 $kg/m^3$, such as between 60 $kg/m^3$ and 70 $kg/m^3$, for example about 65 $kg/m^3$. The padding of either or both of the central, back-supporting section, of the lateral bolster portions may have a density of between 30 $kg/m^3$ and 100 $kg/m^3$, for example between 50 $kg/m^3$ and 80 $kg/m^3$, such as between 60 $kg/m^3$ and 70 $kg/m^3$, for example about 65 $kg/m^3$.

The seat may be an automobile seat.

A second aspect of the invention provides a vehicle, which may be an automobile, comprising a seat as defined above.

DETAILED DESCRIPTION OF THE INVENTION

In order that the invention may be more clearly understood an embodiment thereof will now be described, by way of example only, with reference to the accompanying drawings, of which:

FIG. 4d shows that the main cushion of the seat provided with a shield as shown in FIG. 4c is covered with upholstery that is stretched across the shield, without creases or gapping.

Figure 1:
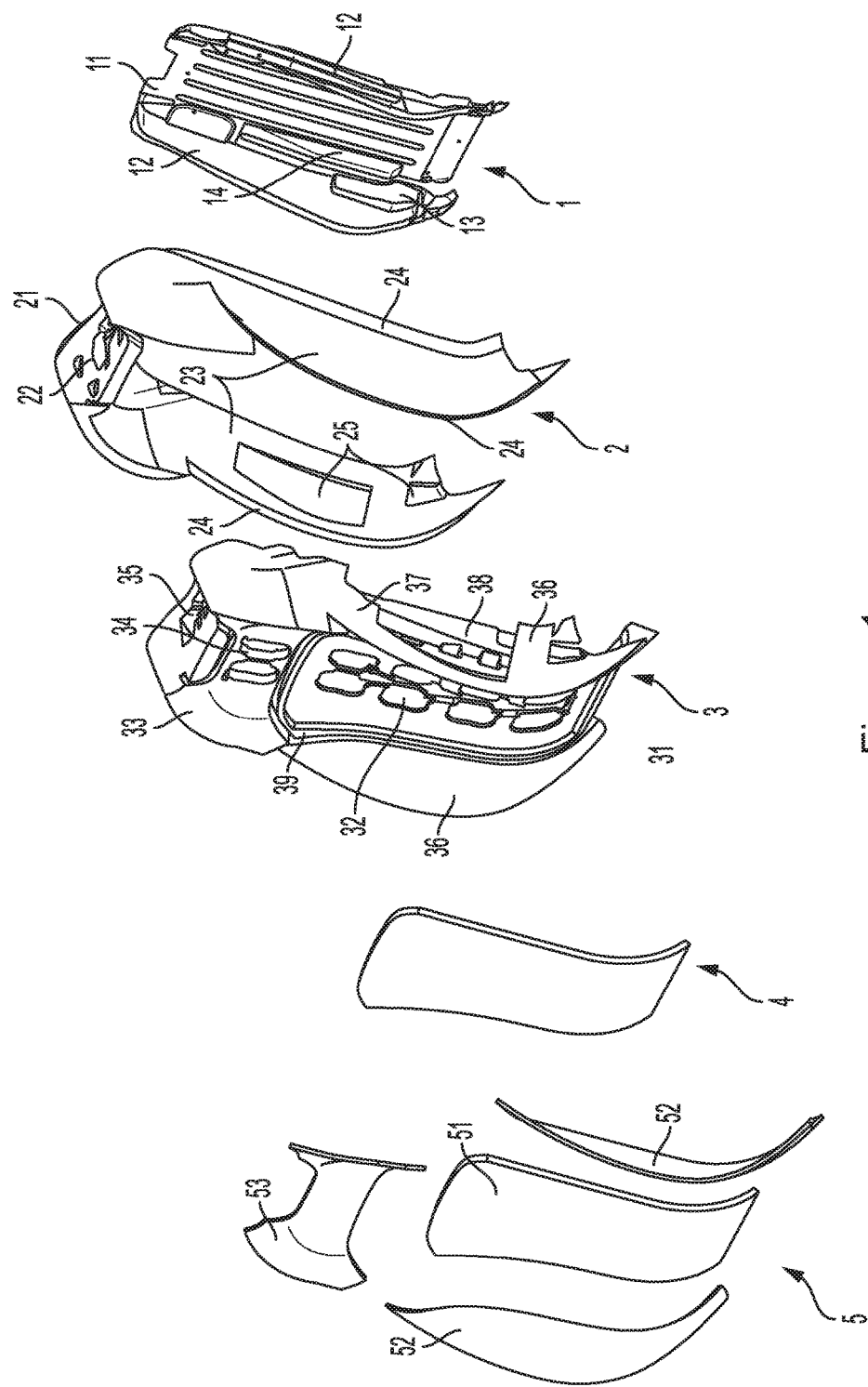
FIG. 1 shows an isometric exploded view of parts of the backrest of an automobile seat according to the invention.

Referring to FIG. 1, a backrest for an automobile seat comprises: a support frame 1, a shield 2, a main cushion 3, a 3D ventilation spacer layer 4, and a layer of heater foam 5. For simplicity, additional, conventional materials to finish the backrest, such as upholstery, trim, clips and accessories for movement/heating/cooling of the seat etc. are not shown in FIG. 1.

The support frame 1 is formed from a hard, strong material, for example metal, or a lightweight alternative and comprises a substantially flat, generally rectangular longitudinally slotted back-plate 11. Each side of the back-plate is provided with a lateral bolster support 12 extending forward, for connection to the main cushion 3. One lateral support 12, in this embodiment is provided with a housing 13 at its lower end, to house parts of the seat electrics, and an aligning projection 14 extends forward, parallel to one lateral support 12, and inwardly thereof, to align the main cushion 3 which, during manufacture is clipped or otherwise attached thereto.

The main cushion 3, which provides the main cushioning function of the seat, comprises a central back-supporting portion 31, which in use is attached to the front of the back-plate 11. The central back-supporting portion 31 of the main cushion 3 is soft and thick, e.g formed of soft foam with an average thickness of about 5 cm, a compressibility of 4 kPa and a density of 65 $kg/m^3$. It is shaped for conformity with an occupant's back, being thicker in the lower region for lumbar support and contouring upwardly. Eight rounded rectangular recesses 32 are provided in the central back-supporting portion 31, which are located symmetrically in two lines of four, one either side of the centreline down the central back-supporting portion 31. The recesses 32 are connected by grooves and may accommodate massage air bladders which are connected by pipes to which are located in the small grooves. Above the central back-supporting portion 31, a shoulder support portion 33 is provided. The shoulder support portion 33 is wider than the central back-supporting portion 31 and also comprises a pair of recesses 34 in line with the two rows of recesses 32. The side portions of the shoulder support portion 33 extend forwardly to provide lateral support to the shoulders of an occupant, and recesses 35 are provided at the top of the shoulder support portion 33 to receive the support structure of a headrest (not shown).

Either side of the central back-supporting portion 31, lateral bolsters 36 are provided. Each lateral bolster 36 is formed from a slightly harder, soft, thick, foam, e.g. having a compressibility of 6 kPa and a density of 65 kg/m$^3$. The lateral bolsters 36 extend forward beneath the forwardly extending side portions of the shoulder support portion 33 to laterally support the sides of the body of an occupant, especially when a vehicle comprising the seats turns.

The lateral bolsters 36 are curved, so as to bulge forward between the top where they meet the forwardly extending sides of the shoulder support portion 33 to the bottom where, once assembled, they meet the seat pan (not shown). The lateral bolsters 36 have generally flat outer sides 37 and follow a convex curve inwardly to meet the central back-supporting section 31. Hence, at the corners, where the flat sides 37 of the lateral bolsters 36 meet the front surface of the lateral bolsters 36, the front surface is curved. Recesses 38 are provided in outer sides 37 of the lateral bolsters 36, in which mechanisms, e.g. inflatable pads, may be provided to squeeze the inward (occupant) facing surfaces of the lateral bolsters inwardly to provide tighter support or better support thinner occupants.

The shield 2 is formed of a harder foam padding, with a compressibility of about 15 kPa, a similar density, e.g. 65 kg/m$^3$, and an average thickness of just 2 cm or less.

In use, the shield 2 surrounds the lateral sides and top of the main cushion 3, in order to provide a surface against which upholstery (not shown) can be tensioned without causing creases or gapping The shield 2 is thin, in this case being on average only about 2 cm thick across its entire shape. In view of the fact that it is less compressible and provides a less soft surface, the shield 2 does not extend onto the occupant supporting faces of the main cushion 3. Nonetheless, the fact that it is also made of foam padding, means that the upholstered seat is still perceived as being formed from a compressible foam material, which is associated with luxury.

Accordingly, the shield 2 comprises a planar upper portion 21 having a generally rectangular shape, but curved upward at the sides to extend over upwardly extending shoulder blade parts of the main cushion 3, which extend upwardly in line with the forwardly extending side portions of the shoulder support portion 33. Apertures 22 extend through the planar upper portion 21 of the shield 2, in line with the headrest support-structure receiving recesses 35 in the top of the shoulder support portion 33.

From the upwardly curving sides of the planar upper portion 21, side guards 23, depend downwardly. The side guards 23 follow the shape of the lateral sides of the main cushion 3, matching the shape of the outer side surfaces of the shoulder support portion 33 and the flat outer sides 37 of the lateral bolsters 36. Accordingly they curve forward to accommodate the bulge of the lateral bolsters 36, then taper downwards to a tip. The side guards 23 do not only cover the flat outer sides 37 of the lateral bolsters 36, but also have fillets 24 extending around the edge of the front and rear of the bolsters 36, tapering to integrate with the front and rear surfaces of the lateral bolsters 36. The fillets 24 extend only a short distance (e.g. about 3 cm) around the front and rear surfaces of the lateral bolsters 36, so as not to affect their compressibility and provide an uncomfortable occupant-supporting surface, but far enough to aid in the avoidance of creases/gapping in the region of the edges.

Apertures 25 may also be provided in one or both side guards 23 to house, for example, control mechanisms (not shown) for operating seat adjustment mechanisms (not shown).

A 3D ventilation spacer layer 4 is provided, which is a layer of 3D spacer fabric of about 1 cm thickness, which in use sits in front of the central back-supporting portion 31 of the main cushion 3, inward of the lateral bolster portions 36. Accordingly, the 3D ventilation spacer layer is generally rectangular, with the same shape as the front face of the central back-supporting portion. Although generally the same shape as the central back supporting section 31, the 3D ventilation spacer layer 4 is slightly smaller e.g. 2 cm narrower and 2 cm shorter so as to sit within a border 39 of the central back supporting portion 31, which extends forward by about 1 cm and is about 1 cm wide, such that the front surface of the border 39 and the front surface of the 3D ventilation spacer layer are coplanar, to seal the edges of the 3D ventilation spacer layer and allow air to be extracted from the front of the seat, to help cool the occupant in the seat.

Finally, the layer of heater foam 5 (i.e. foam incorporating heating elements to heat the seats) is provided. The layer of heater foam is formed in four pieces for ease of assembly—a central heater foam piece 51 has the same shape as the central back supporting portion 31 and sits in front of the 3D ventilation spacer layer 4 in use. Two lateral heater foam pieces 52 cover the occupant supporting faces of the lateral bolster portion extending between the fillets 24 of the shield 2 and the lateral edges of the central heater foam piece 51. Finally, an upper heater foam piece 53 has the same shape as the front (occupant supporting) face of the shoulder portion 33 of the main cushion 3, somewhat dumbbell shaped, with a generally rectangular centre, and wings to each side extending upward and downward.

The backrest of a seat is made from the parts shown in FIG. 1 by first forming the main cushion 3 by adhering the lateral bolsters 36, shoulder support portion 33 and central back-supporting portion 31 together to form the main cushion 3, then adhering the shield 2 to the periphery of the main cushion 3, such that the side guards 23 are located at the periphery of the lateral bolster portions 36 and the planar upper portion 21 is adhered to the top of the shoulder portion 33 (it is expected that it may be possible to form the various portions of the main cushion 3 and the shield 2 in the same mould, such that the adhering step is not necessary). The back of the main cushion 3 is then attached (e.g. by means of clips or the like) to the front of the support frame, lining up the aligning portions 14 of the support frame 1 with an alignment groove (not shown) in the back of the main cushion 3 and slotting the lateral bolster supports 12 into slots in the main cushion 3 (not shown), or between the main cushion 3 and the shield 2, so as to provide stability behind the padding provided by the main cushion 3.

Components are introduced into the recesses 32 in the front of the central back-supporting portion 31 of the main cushion and the 3D ventilation spacer layer 4 is attached in front of the components, within the border 39. The heater foam 5 is then applied over the occupant supporting surface of the main cushion 3, covering the central back-supporting portion 31 (in front of the 3D ventilation spacer layer), both lateral bolster portions 36 and the shoulder supporting portion 33 and adhered thereto.

With the backrest thus assembled, any further components of the backrest may be installed and upholstery, e.g. leather panels (not shown), is applied by conventional methods of sewing the panels together using thread and fixings. This cover is put over the seat like a bag, with fixings connected at the front of the seat. The leather panels covering the lateral sides of the seat will be stretched around the side guards 23 of the shield 2, rather than abutting the soft main cushion 3, and thus, tension, in particular between the front and rear peripheries of the lateral sides of the backrest, where the fillets 24 extend, will not cause the sides of the backrest to crease or form visible gaps, owing to the lower degree of compressibility (i.e. higher value of compressibility in kPa) than the main cushion 3 preventing these areas from crushing.

Figure 2:
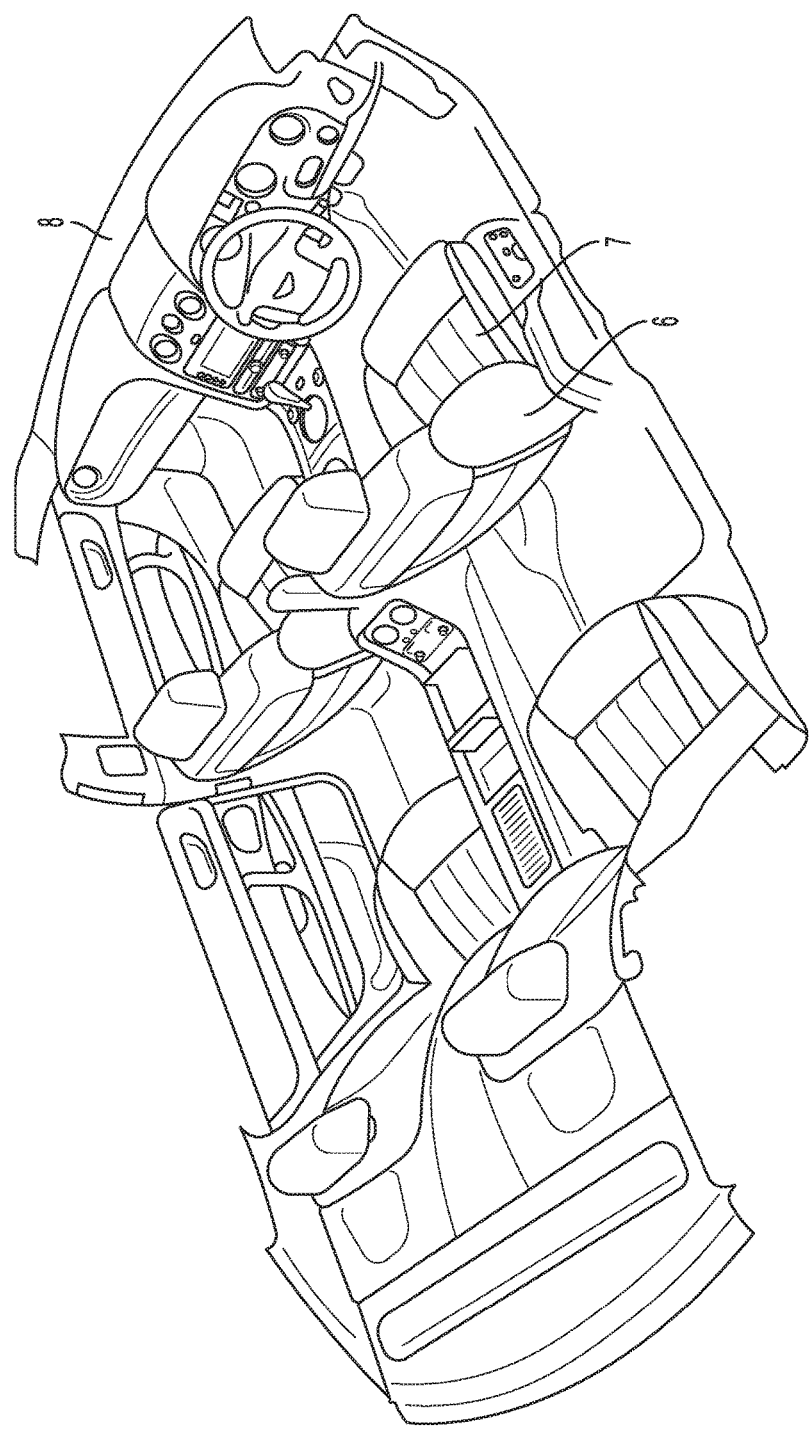
FIG. 2 shows a part perspective view of an automobile comprising an automobile seat having a backrest according to the invention.
Figure 4A:
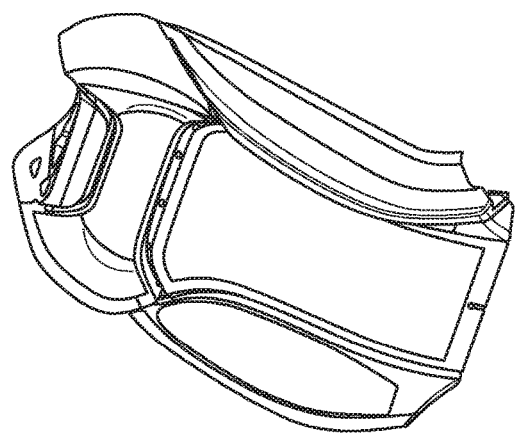
FIG. 4a shows the assembled main cushion and shield.
Figure 4:
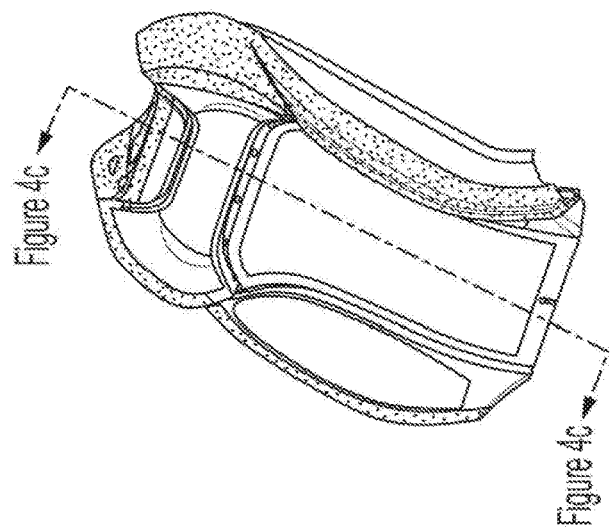
FIG. 4 shows the assembled main cushion and shield (as shown in stippled format). Also shown is a cross-section of the seat, which is further shown in FIG. 4c.
Figure 3:
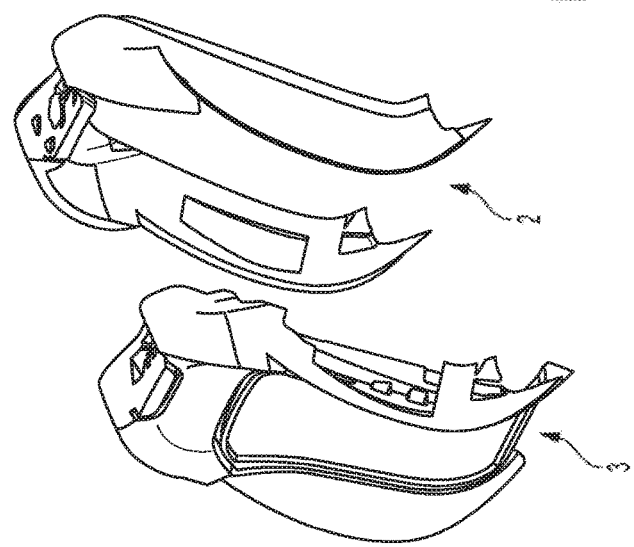
FIG. 3 shows the main cushion 3 and the shield 2.
Figure 4C:
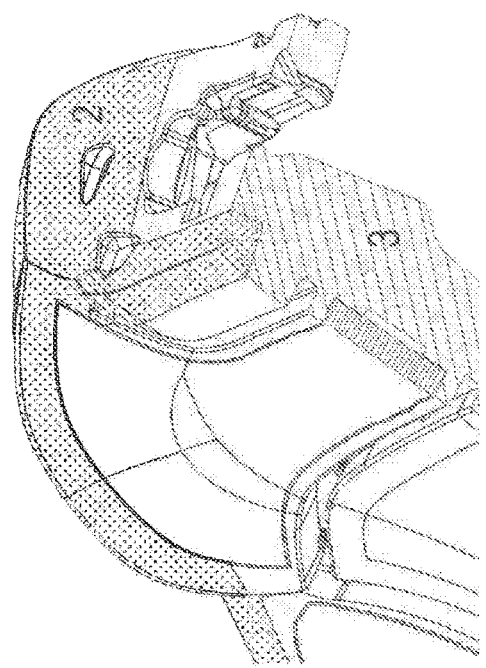
FIG. 4c shows that the main cushion of the seat is provided with a shield that surrounds at least part of the lateral sides of the main cushion. The shield is formed of a less compressible foam than the main cushion.
Figure 4B:
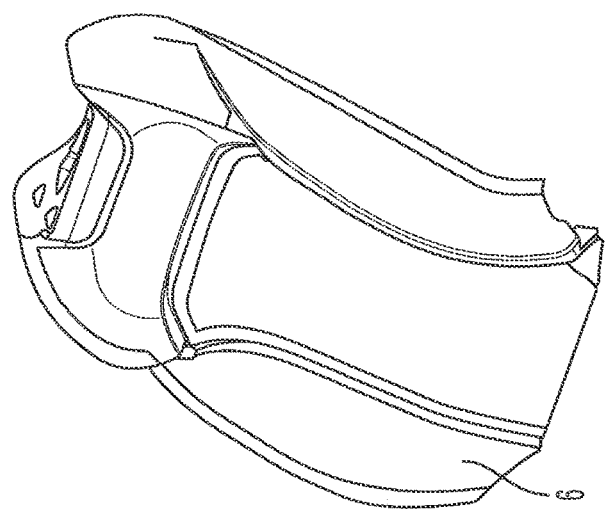
FIG. 4b shows the upholstered backrest 6.

With reference to FIG. 2, the upholstered backrest 6 may then be incorporated into an automobile seat 7 by conventional means and incorporated into an automobile 8.

The above embodiment is described by way of example only. Many variations are possible without departing from the scope of the invention as defined in the appended claims.

What is claimed is:

1. An automobile seat comprising:
   (a) a main cushion formed of padding; and
   (b) a shield formed of padding and being a layer less than 5 cm thick, wherein the shield surrounds at least part of the lateral sides of the main cushion, wherein the padding of the shield has a first compressibility, and the padding of the main cushion has a second compressibility, and wherein the first compressibility of the shield padding is lower than the second compressibility of the main cushion padding;
   wherein the main cushion comprises either:
   (c) a backrest cushion comprising a central back supporting section, or
   (d) a seat-cushion, or
   (e) a backrest cushion and a seat-cushion, and
   wherein the main cushion further comprises:
   (f) lateral bolster portions having laterally outer sides;
   wherein the lateral bolster portions comprise:
   (g) front surfaces which, in use, face forwards,
   (h) laterally outer sides; and
   (i) front corners between laterally outer sides and the front surfaces of the lateral bolster portions,
   wherein the shield extends around the front corners of the bolster portions and covers at least a portion of the front surfaces of the bolster portions, and an upholstery is stretched around the shield,
   such that when the upholstery is stretched around the shield, creases in the upholstery are reduced or prevented, and gapping is avoided.

2. The seat according to claim 1 wherein the shield is between 1.5 cm thick and 2.5 cm thick.

3. The seat according to claim 1 wherein the shield has a first thickness, being its thickness at its thickest part, and the main cushion has a second thickness, being its thickness at its thickest part, and the second thickness is greater than the first thickness.

4. The seat according to claim 1 wherein the shield shields the laterally outer sides of the lateral bolster portions.

5. The seat according to claim 1 wherein the compressibility of the central section and the lateral bolster portions is different, such that the seat comprises a shield formed of padding having a first compressibility, a central section comprising padding having a second compressibility and bolster portions comprising padding having a third compressibility, wherein the first compressibility is lower than the second compressibility and the third compressibility;
the third compressibility is lower than the second compressibility; and wherein upholstery is stretched around the shield.

6. The seat according to claim 5 wherein the third compressibility is between 5 and 10 kPa.

7. The seat according to claim 1 wherein the first compressibility is 13 to 28 kPa.

8. The seat according to claim 1 wherein the second compressibility is less than 6 kPa.

9. The seat according to claim 1 comprising a headrest situated above the main cushion wherein the shield extends beneath the headrest.

10. The seat according to claim 1 further comprising a layer of 3D ventilation spacer fabric in front of the central back-supporting section of the main cushion.

11. The seat according to claim 1 further comprising a layer of heater foam in front of the main cushion wherein the heater foam is positioned in front of the central back supporting section.

12. The seat according to claim 1 wherein the upholstery is selected from leather, suede, or alcantara.

13. The seat according to claim 1 wherein the shield is less than 3 cm thick.

14. The seat according to claim 1 wherein the central back-supporting portion of the main cushion 3 is soft and thick; each lateral bolster is formed from a slightly harder, soft, thick, foam; and the shield is formed of a harder foam padding.

* * * * *